US012789877B2

(12) United States Patent
Zhu

(10) Patent No.: US 12,789,877 B2
(45) Date of Patent: Nov. 10, 2026

(54) CHILD STROLLER FRAME

(71) Applicant: Zhongshan Zetababy Industrial co., Ltd, Zhongshan (CN)

(72) Inventor: Peixiang Zhu, Zhongshan (CN)

(73) Assignee: Zhongshan Zetababy Industrial co., Ltd, Zhongshan (CN)

(*) Notice: Subject to any disclaimer, the term of this patent is extended or adjusted under 35 U.S.C. 154(b) by 92 days.

(21) Appl. No.: 19/090,330

(22) Filed: Mar. 25, 2025

(65) Prior Publication Data

US 2026/0048782 A1 Feb. 19, 2026

(30) Foreign Application Priority Data

Aug. 19, 2024 (CN) ......................... 202422017490.8

(51) Int. Cl.
*B62B 7/06* (2006.01)
*B62B 9/20* (2006.01)

(52) U.S. Cl.
CPC ................ *B62B 7/062* (2013.01); *B62B 9/20* (2013.01); *B62B 2205/20* (2013.01)

(58) Field of Classification Search
CPC ........ B62B 7/062; B62B 9/20; B62B 2205/20
See application file for complete search history.

(56) References Cited

U.S. PATENT DOCUMENTS 7,178,822 B2 * 2/2007 Chen ........................ B62B 7/083 280/647
7,374,196 B2 * 5/2008 Hartenstine ............... B62B 9/20 280/47.38
8,496,263 B2 * 7/2013 Wu ........................... B62B 7/08 280/47.38
8,602,442 B2 * 12/2013 Li ........................... B62B 7/062 280/647
9,050,993 B2 * 6/2015 Pollack ...................... B62B 7/08
9,517,788 B2 * 12/2016 He ............................ B62B 7/08
9,950,730 B2 * 4/2018 Gao ........................ B62B 7/062
11,230,314 B2 * 1/2022 Liwei ........................ B62B 7/10
2005/0098983 A1 * 5/2005 Cheng ....................... B62B 7/08 280/642
2012/0056408 A1 * 3/2012 Wu ......................... B62B 7/083 280/642
2026/0048782 A1 * 2/2026 Zhu ......................... B62B 7/062

FOREIGN PATENT DOCUMENTS

CN 222022745 U * 11/2024
WO WO-2018095078 A1 * 5/2018 ............... B62B 9/10

* cited by examiner

*Primary Examiner* — Jacob B Meyer
(74) *Attorney, Agent, or Firm* — Che-Yang Chen

(57) ABSTRACT

A child stroller frame includes two front rods, two rear rods, two support rods, and two push rods, each front rod is connected between a front connecting base and a front wheel frame, each rear rod is connected between a rear connecting base and a rear wheel frame, each support rod is connected between a lower connecting base and an upper connecting base, a lower end of each push rod is connected to a push rod connecting base, a first transmission rod is rotatably connected between the push rod connecting base and the rear connecting base, a second transmission rod is hinged between the first transmission rod and the front wheel frame, each support rod is rotatably connected to a rotation sleeve, a handrail rod is slidable in each rotation sleeve, a rear end of the handrail rod is rotatably connected to the first transmission rod.

12 Claims, 10 Drawing Sheets

CHILD STROLLER FRAME

CROSS REFERENCE OF RELATED APPLICATION

This application is a non-provisional application that claims priority under 35 U.S.C. § 119 to China application number CN202422017490.8, filing date Aug. 19, 2024, wherein the entire content of which is expressly incorporated herein by reference.

BACKGROUND OF THE PRESENT INVENTION

Field of Invention

The present invention relates to a child stroller frame.

Description of Related Arts

Child strollers are common products in the growth process of infants and young children. Modern strollers can generally be unfolded for seating or folded for storage and portability. However, conventional stroller frame structures vary widely, and many strollers still have large volumes and heavy weights even when folded, making them inconvenient to carry and taking up significant storage space.

SUMMARY OF THE PRESENT INVENTION

The invention is advantageous in that it overcomes the deficiencies of conventional technology by providing a child stroller frame that is lightweight and compact when folded.

The present invention is realized through a child stroller frame which can be moved from an unfolded state to a folded state upon unlocking a locking mechanism. The child stroller frame comprises two front rods, two rear rods, two support rods, and two push rods which are all made of carbon fiber material, wherein an upper end of each front rod is connected to a front connecting base, while a lower end thereof is connected to a front wheel frame which is connected with a front wheel, an upper end of each rear rod is connected to a rear connecting base which is rotatably connected to the front connecting base around a first axis, a lower end of each rear rod is connected to a rear wheel frame which is connected with a rear wheel, a lower end of each support rod is connected to a lower connecting base which is rotatably connected to the rear connecting base around a second axis, an upper end of each support rod is connected to an upper connecting base, a lower end of each push rod is connected to a push rod connecting base which is rotatably connected to the upper connecting base around a third axis, a lower end of each push rod connecting base is rotatably connected to a first transmission rod around a fourth axis, a lower end of the first transmission rod is rotatably connected to the rear connecting base around a fifth axis, a second transmission rod is hinged between the lower end of the first transmission rod and the front wheel frame, a middle section of each support rod is rotatably connected to a rotation sleeve around a sixth axis, a handrail rod is slidable along an inner side of each corresponding rotation sleeve, a rear end of the handrail rod is rotatably connected to the first transmission rod around a seventh axis, while front ends of the two sliding handrail rods are detachable connected to a U-shaped handle.

Each lower connecting base is rotatably connected to a rotation base around an eighth axis, a base rod is slidable along an inner side of the corresponding rotation base, a rear end of the base rod is rotatably connected to the corresponding first transmission rod around a ninth axis.

Each rotation base comprises a base body rotatably connected to the corresponding lower connecting base, the base body is provided with an inwardly protruding portion having a sliding channel for allowing the sliding movement of the corresponding base rod, the base body has one or more mounting holes for assembling a flexible seat cushion.

Each rotation sleeve comprises a first rotation body that is rotatably connected to the corresponding support rod, a rear end of the first rotation body is provided with an integrated second rotation body protruding upwards, wherein the second rotation body has a through hole for the corresponding handrail rod to slide therethrough, wherein in the unfolded state, the lower side of each handrail rod rests against the wall of the through hole and an upper surface of the first rotation body.

A front part of each base rod is connected to a leg support frame, the leg support frame comprises a front support leg that can rotate with respect to the base rod, on the rear side of the front support leg, there is a pivot rod that can rotate with respect to it, a positioning structure is provided between the pivot rod and the base rod to lock the leg support frame in place, the positioning structure comprises a first positioning protrusion and a second positioning protrusion at the front end of the base rod, the pivot rod is provided with a locking block that can engage or disengage from the positioning protrusions when rotated, a reset component is provided between the pivot rod and the front support leg to push the pivot rod back into position, a fabric sleeve can be installed on the leg support frame for supporting the child's legs.

Upper ends of the two push rods are assembled with a U-shaped push handle for convenient gripping, the locking mechanism is located between at least a set of the push rod connecting base and the upper connecting base, a middle of the push handle is provided with an unlocking assembly for controlling the unlocking operation.

The locking mechanism comprises a first connection housing on the push rod connecting base and a second connection housing on the upper connecting base, both housings have multiple locking slots arranged circumferentially, inside the space enclosed by these housings, a spline moves laterally to engage both locking slots simultaneously, a movable component is positioned between the spline and the first connection housing, the unlocking assembly is coupled to the movable component, a reset spring is provided between the spline and the first connection housing to push the spline back into its original position.

The movable component comprises a main body with multiple inclined grooves arranged circumferentially, the first connection housing is provided with multiple inclined protrusions that match the inclined grooves, when the main body is rotated, these inclined protrusions are respectively engaged with the inclined grooves, causing the main body to move laterally, which in turn pushes the spline out of engagement with the locking slots of the first connection housing, thereby unlocking the locking mechanism.

The unlocking assembly comprises a fixing housing mounted on the push handle, the fixing housing comprises a front shell and a rear shell that clamp the push handle between them, wherein inside the fixing housing, an exposed operation block can slide with respect to the fixing housing, a sliding block is positioned inside the fixing housing and move laterally when pushed by the operation block, the sliding block has a first inclined surface, while the operation block has a second inclined surface that pushes against the first inclined surface when sliding inward, a pull cord connects the sliding block to the main body of the movable component, a first spring is provided inside the fixing housing to push the operation block back to its original position, the operation block has a square slot and a narrower clearance slot communicated to the square slot, a secondary lock button, which is also provided inside the fixing housing, comprises a blocking piece that fits into the square slot to prevent the operation block from sliding, the blocking piece is connected to a press rod that extends outside the fixing housing, when the blocking piece disengages from the square slot, the press rod moves within the clearance slot, a second spring is provided inside the fixing housing to push the secondary lock button back to its original position.

A backrest can be rotatably connected to the rotation bases.

Compared to prior art, the present invention has the following advantages.

1. During folding, the locking mechanism is first unlocked, then the push rods are pushed forward and pressed downward, each push rod connecting base pushes the upper end of the corresponding first transmission rod and the corresponding upper connecting base downward, causing the corresponding first transmission rod and the corresponding support rod to rotate towards the corresponding rear rod, as the first transmission rod rotates, its lower end tilts upward, pulling the corresponding second transmission rod, which in turn pulls the corresponding front rod towards the corresponding rear rod, during this process, the rotating first transmission rod pulls the rear end of the handrail rod and move with respect to the corresponding handrail rod, causing the corresponding handrail rod to slide backward along the inner side of the rotation sleeve, and the handle moves backward, this design ensures that after folding, the handle does not extend excessively forward, keeping the stroller frame compact for easy carrying and storage. Additionally, the front rods, the rear rods, the support rods, and the push rods 4 are all made of carbon fiber material, ensuring sufficient strength while keeping the stroller frame lightweight and easy to carry.
2. During folding, the first transmission rod pulls the rear end of the base rod and move with respect to the base rod, causing the base rod to slide backward along the inner side of the rotation base, this prevents the base rod from extending excessively forward after folding, ensuring a compact folded stroller frame for easy carrying or storage.
3. When the child stroller frame is in the unfolded state, the handrail rod rests against the wall of the through hole of the second rotation body and the upper surface of the first rotation body, so as to provide a large support area for stability and making it safer for a child to hold.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
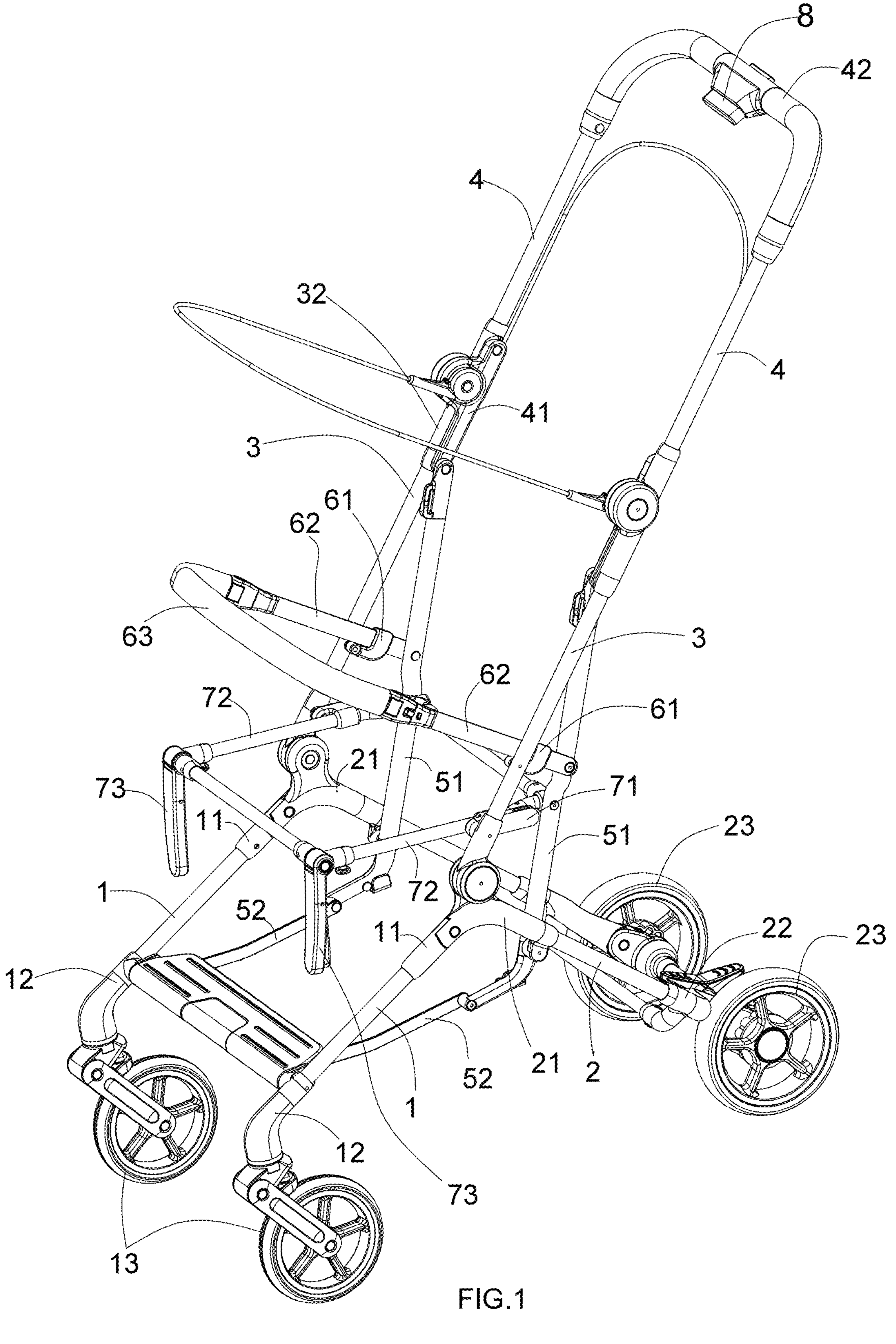
FIG. 1 is a perspective view of a child stroller frame according to a preferred embodiment of the present invention.
Figure 2:
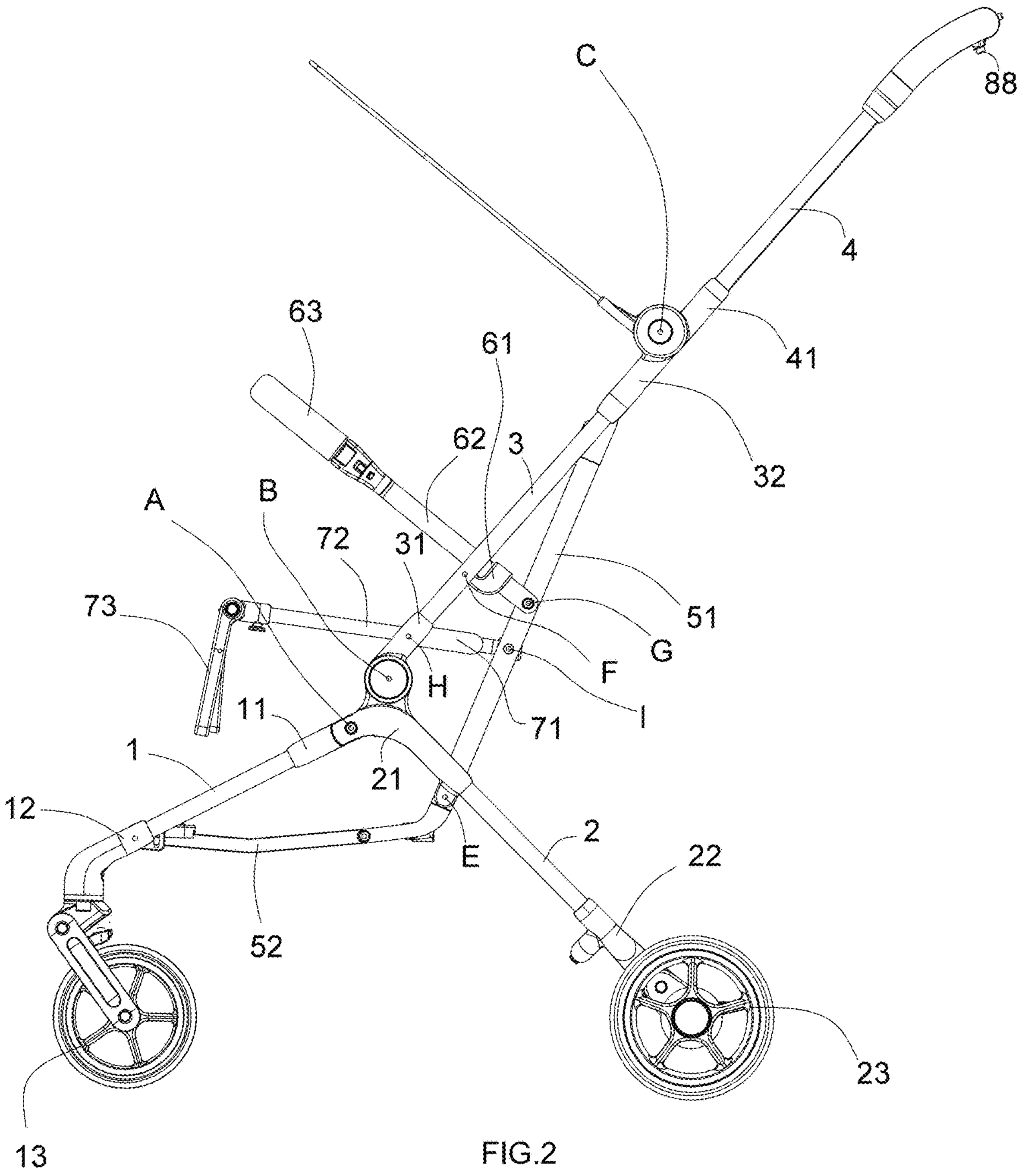
FIG. 2 is a side view of the child stroller frame according o the preferred embodiment of the present invention.
Figure 3:
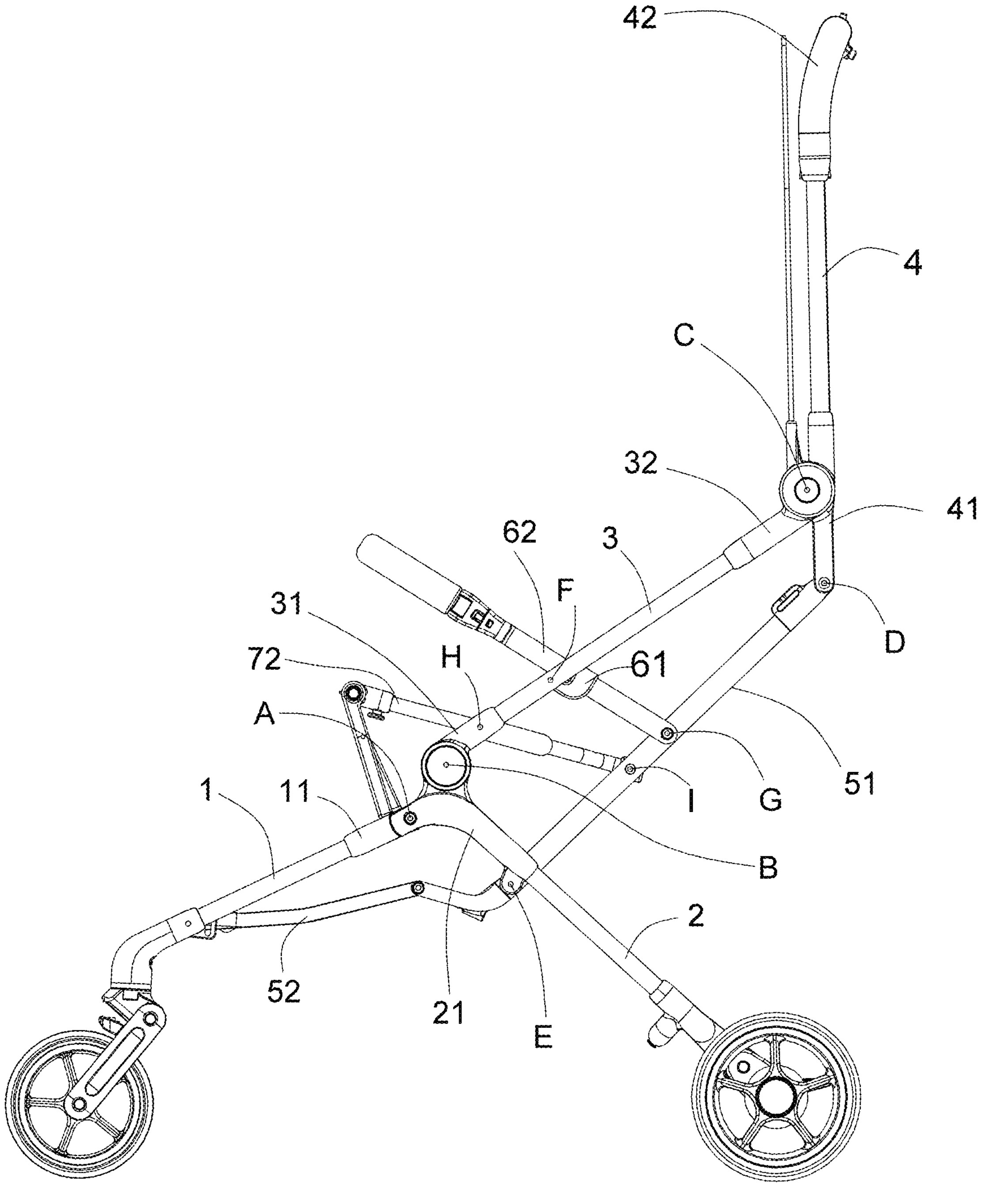
FIG. 3 is a side view illustrating the child stroller frame being in a folding process according o the preferred embodiment of the present invention.
Figure 4:
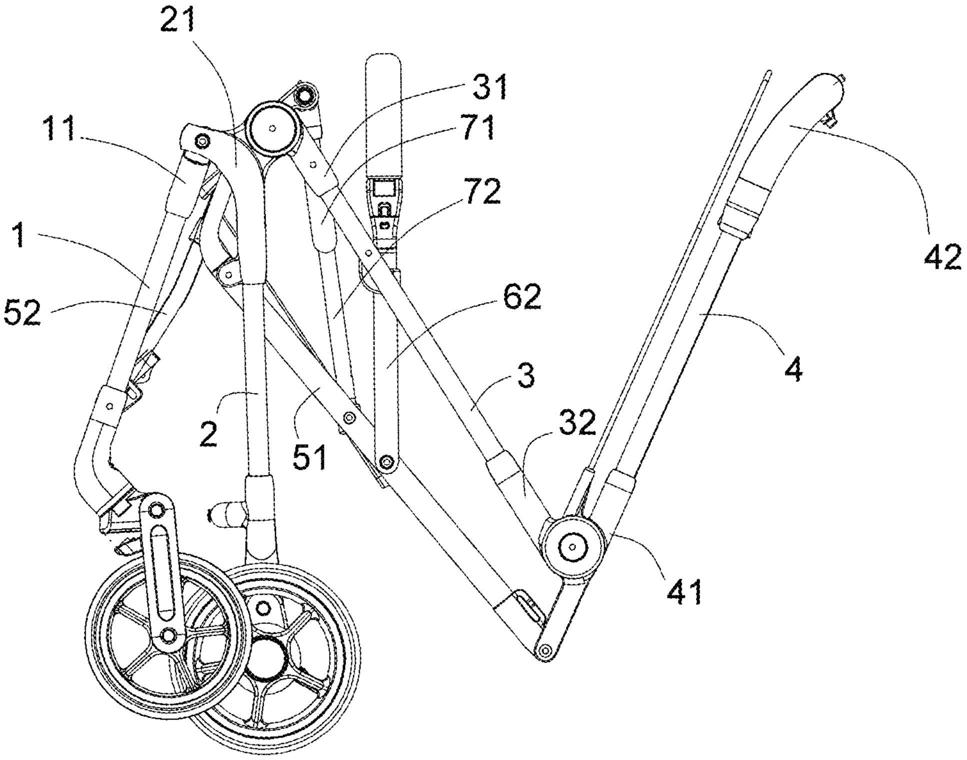
FIG. 4 is another side view illustrating the child stroller frame being in a folding process according o the preferred embodiment of the present invention.
Figure 5:
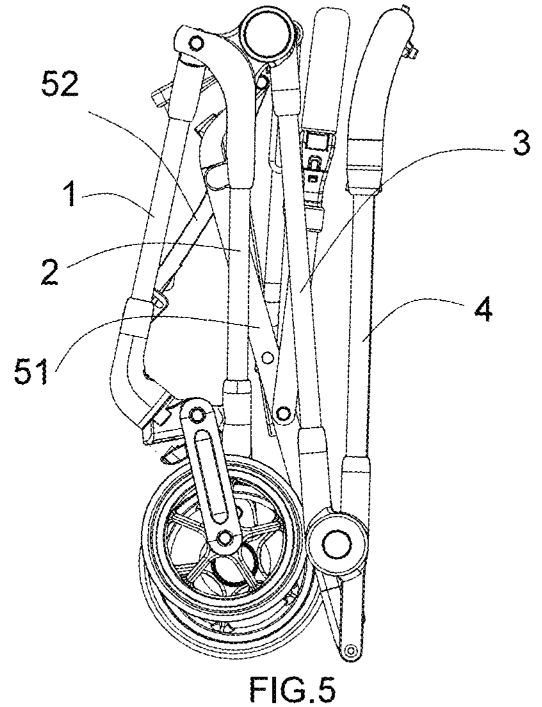
FIG. 5 is a side view illustrating the child stroller frame being in a folded state according o the preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 6 of the drawings, a child stroller frame according to a preferred embodiment of the present invention is illustrated, the child stroller frame can be moved from an unfolded state to a folded state after unlocking a locking mechanism 100. More specifically, the child stroller frame comprises two front rods 1, two rear rods 2, two support rods 3, and two push rods 4, the front rods 1, the two rear rods 2, the two support rods 3 and the two push rods 4 are all made of carbon fiber material. An upper end of each front rod 1 is connected to a front connecting base 11, while a lower end thereof is connected to a front wheel frame 12 which is connected with a front wheel 13. An upper end of each rear rod 2 is connected to a rear connecting base 21 which is rotatably connected to the front connecting base 11 around a first axis A. A lower end of each rear rod 2 is connected to a rear wheel frame 22 which is connected with a rear wheel 23. A lower end of each support rod 3 is connected to a lower connecting base 31 which is rotatably connected to the rear connecting base 21 around a second axis B. An upper end of each support rod 3 is connected to an upper connecting base 32. A lower end of each push rod 4 is connected to a push rod connecting base 41 which is rotatably connected to the upper connecting base 32 around a third axis C. A lower end of each push rod connecting base 41 is rotatably connected to a first transmission rod 51 around a fourth axis D. A lower end of the first transmission rod 51 is rotatably connected to the rear connecting base 21 around a fifth axis E. A second transmission rod 52 is hinged between the lower end of the first transmission rod 51 and the front wheel frame 12. A middle section of each support rod 3 is rotatably connected to a rotation sleeve 61 around a sixth axis F. A handrail rod 62 is slidable along an inner side of each corresponding rotation sleeve 61, a rear end of the handrail rod 62 is rotatably connected to the first transmission rod 51 around a seventh axis G, while front ends of the two sliding handrail rods 62 are detachable connected to a U-shaped handle 63. During folding, the locking mechanism 100 is first unlocked, then the push rods 4 are pushed forward and pressed downward. Each push rod connecting base 41 pushes the upper end of the corresponding first transmission rod 51 and the corresponding upper connecting base 32 downward, causing the corresponding first transmission rod 51 and the corresponding support rod 3 to rotate towards the corresponding rear rod 2. As the first transmission rod 51 rotates, its lower end tilts upward, pulling the corresponding second transmission rod 52, which in turn pulls the corresponding front rod 1 towards the corresponding rear rod 2. During this process, the rotating first transmission rod 51 pulls the rear end of the handrail rod 62 and move with respect to the corresponding handrail rod 62, causing the corresponding handrail rod 62 to slide backward along the inner side of the rotation sleeve 61, and the handle 63 moves backward. This design ensures that after folding, the handle 63 does not extend excessively forward, keeping the stroller frame compact for easy carrying and storage. Additionally, the front rods 1, the rear rods 2, the support rods 3, and the push rods 4 are all made of carbon fiber material, ensuring sufficient strength while keeping the stroller frame lightweight and easy to carry.

As shown in FIGS. 1 to 6, each lower connecting base 31 is also rotatably connected to a rotation base 71 around an eighth axis H. A base rod 72 is slidable along an inner side of the corresponding rotation base 71, a rear end of the base rod 72 is rotatably connected to the corresponding first transmission rod 51 around a ninth axis I. During folding, the first transmission rod 51 pulls the rear end of the base rod 72 and move with respect to the base rod 72, causing the base rod 72 to slide backward along the inner side of the rotation base 71. This prevents the base rod 72 from extending excessively forward after folding, ensuring a compact folded stroller frame for easy carrying or storage. A backrest, not shown in the figures, can also be rotatably connected to the rotation bases 71. During folding, each base rod 72 moves backward, causing a lower end of the backrest and the corresponding rotation base 71 to move forward with respect to the base rod 72. When the backrest rotates backward for folding, it aligns with the rear rods 2, ensuring that even a stroller frame with a backrest remains compact after folding.

Figure 12:
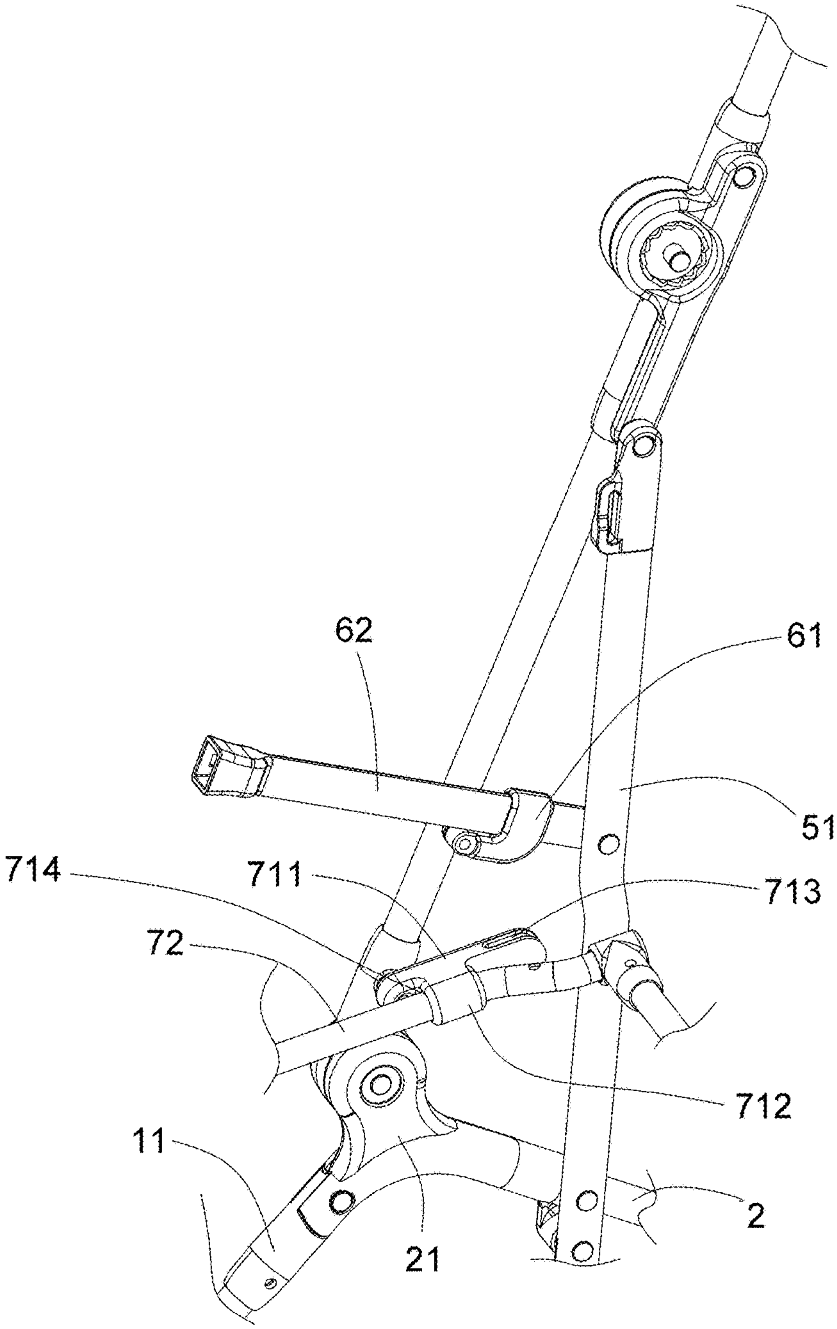
FIG. 12 is a perspective view illustrating a rotation base and a base rod of the child stroller frame according o the preferred embodiment of the present invention.

As shown in FIG. 12, each rotation base 71 comprises a base body 711 rotatably connected to the corresponding lower connecting base 31. The base body 711 is provided with an inwardly protruding portion 712 having a sliding channel 714 for allowing the sliding movement of the corresponding base rod 72. Additionally, the base body 711 has one or more mounting holes 713 for assembling a flexible seat cushion. The seat cushion can be secured to the base rod 72 using straps passing through these mounting holes 713, ensuring convenient and stable installation.

Figure 13:
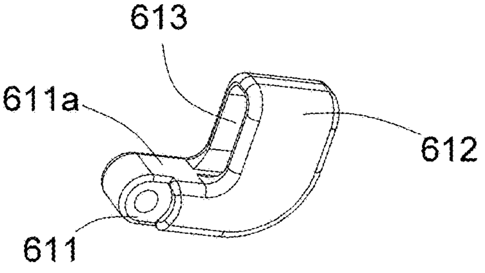
FIG. 13 is a perspective view illustrating a rotation sleeve of the child stroller frame according to the preferred embodiment of the present invention.

As shown in FIGS. 12 and 13, each rotation sleeve 61 comprises a first rotation body 611 that is rotatably connected to the corresponding support rod 3. A rear end of the first rotation body 611 is provided with an integrated second rotation body 612 protruding upwards, featuring a through hole 613 for the corresponding handrail rod 62 to slide therethrough. In the unfolded state, the lower side of each handrail rod 62 rests against the wall of the through hole 613 and an upper surface 611*a* of the first rotation body 611, ensuring a large contact area for enhanced support and stability. This design makes the handle 63 more secure and stable for the child to hold.

Figure 6:
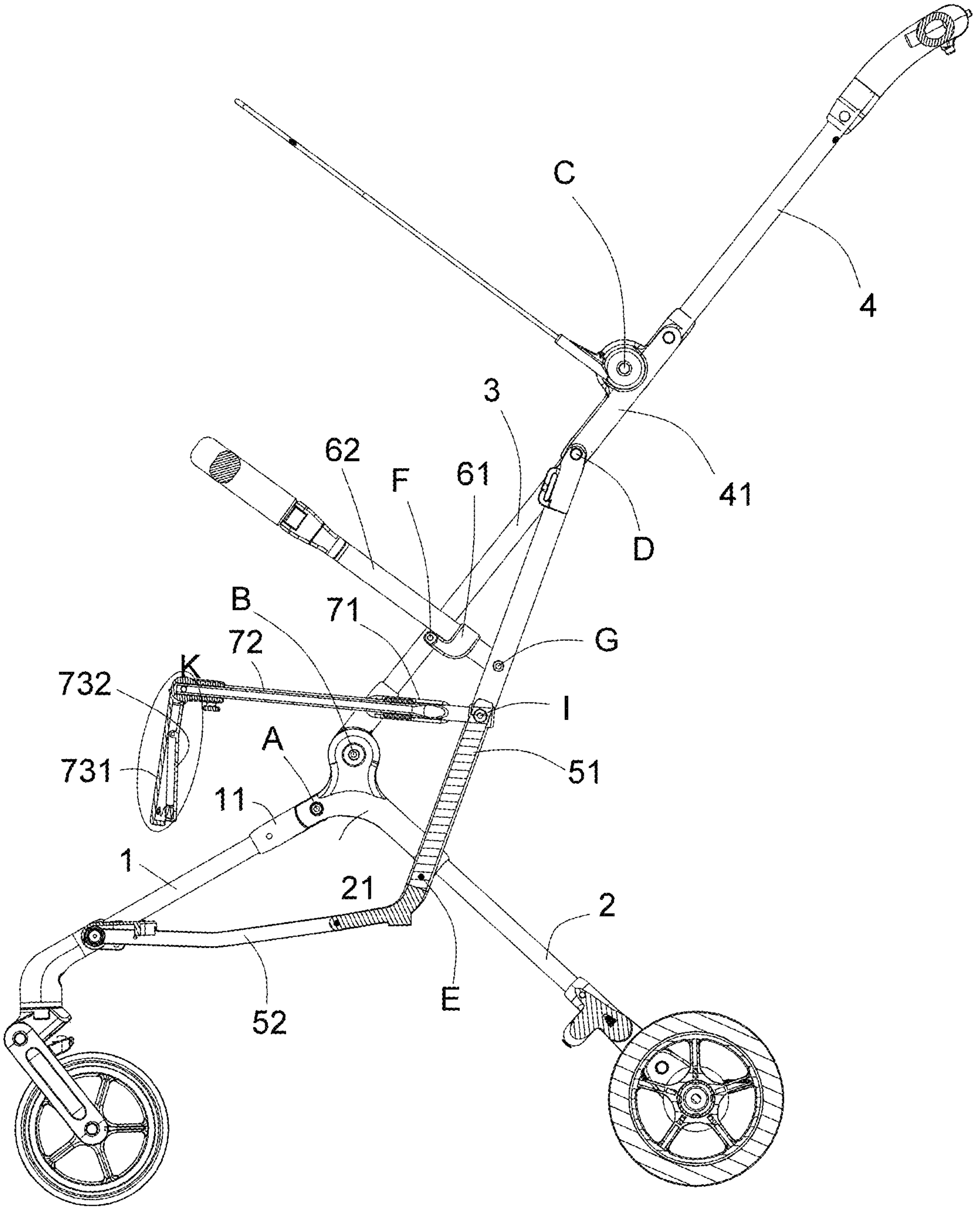
FIG. 6 is a cross sectional view of the child stroller frame according o the preferred embodiment of the present invention.
Figure 14:
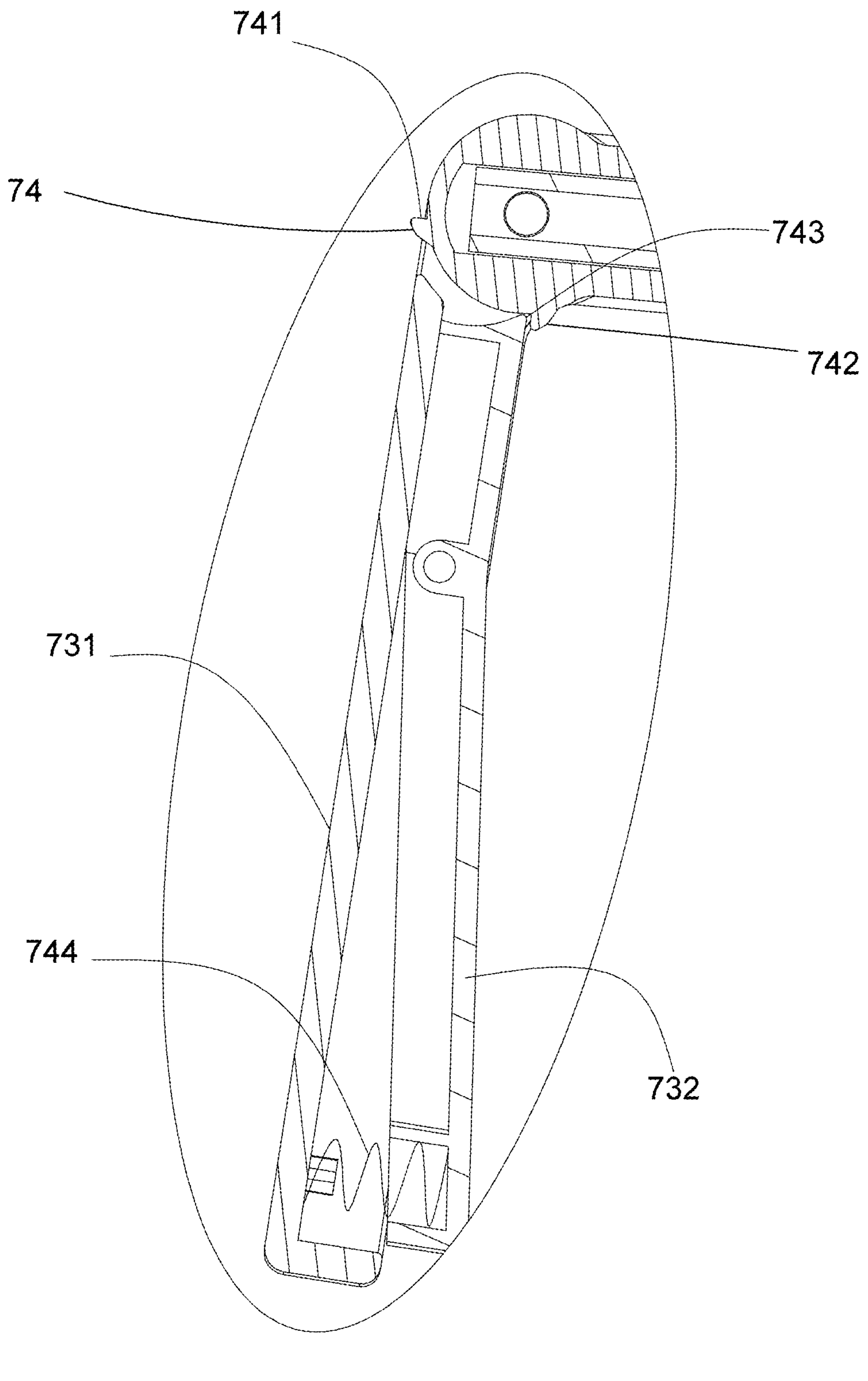
FIG. 14 is a partial enlarged view of an area K of FIG. 6.

As shown in FIGS. 1, 6, and 14, a front part of each base rod 72 is connected to a leg support frame 73. The leg support frame 73 comprises a front support leg 731 that can rotate with respect to the base rod 72. On the rear side of the front support leg 731, there is a pivot rod 732 that can rotate with respect to it. A positioning structure 74 between the pivot rod 732 and the base rod 72 locks the leg support frame 73 in place. The positioning structure 74 comprises a first positioning protrusion 741 and a second positioning protrusion 742 at the front end of the base rod 72. The pivot rod 732 is provided with a locking block 743 that can engage or disengage from the positioning protrusions 741, 742 when rotated. A reset component 744 is provided between the pivot rod 732 and the front support leg 731 to push the pivot rod 732 back into position. A fabric sleeve can be installed on the leg support frame 73 for supporting the child's legs. When the locking block 743 is engaged with the second positioning protrusion 742, the leg support frame 73 is in an inclined position, allowing the child's legs to rest on the fabric sleeve for a comfortable seating position. When the locking block 743 engages with the first positioning protrusion 741, the leg support frame 73 aligns with the base rod 72, effectively extending the seat length for the child to lie down. To adjust the position of the leg support frame 73, the pivot rod 732 is simply rotated to disengage the locking block 743 from the positioning protrusions 741, 742. The front support leg 731 can then be rotated to the desired position before releasing the pivot rod 732 to lock it in place.

Figure 7:
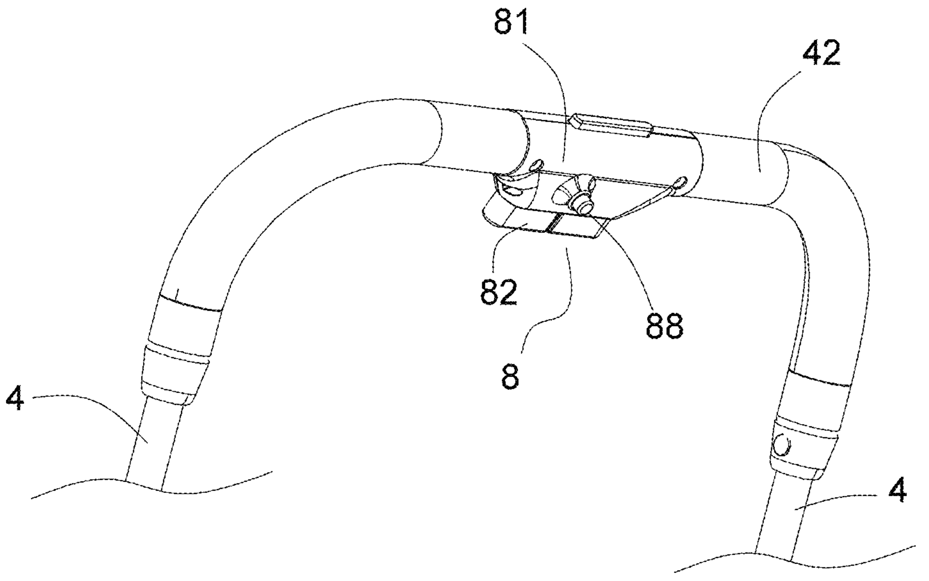
FIG. 7 is a perspective view illustrating an unlocking assembly of the child stroller frame according o the preferred embodiment of the present invention.
Figure 8:
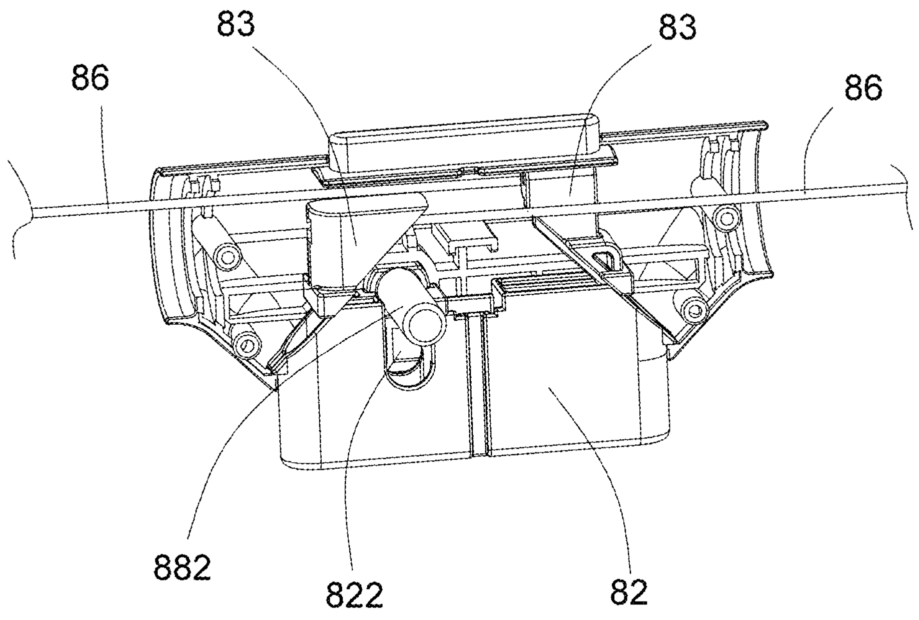
FIG. 8 is a schematic view illustrating the structure of the unlocking assembly of the child stroller frame according o the preferred embodiment of the present invention.
Figure 9:
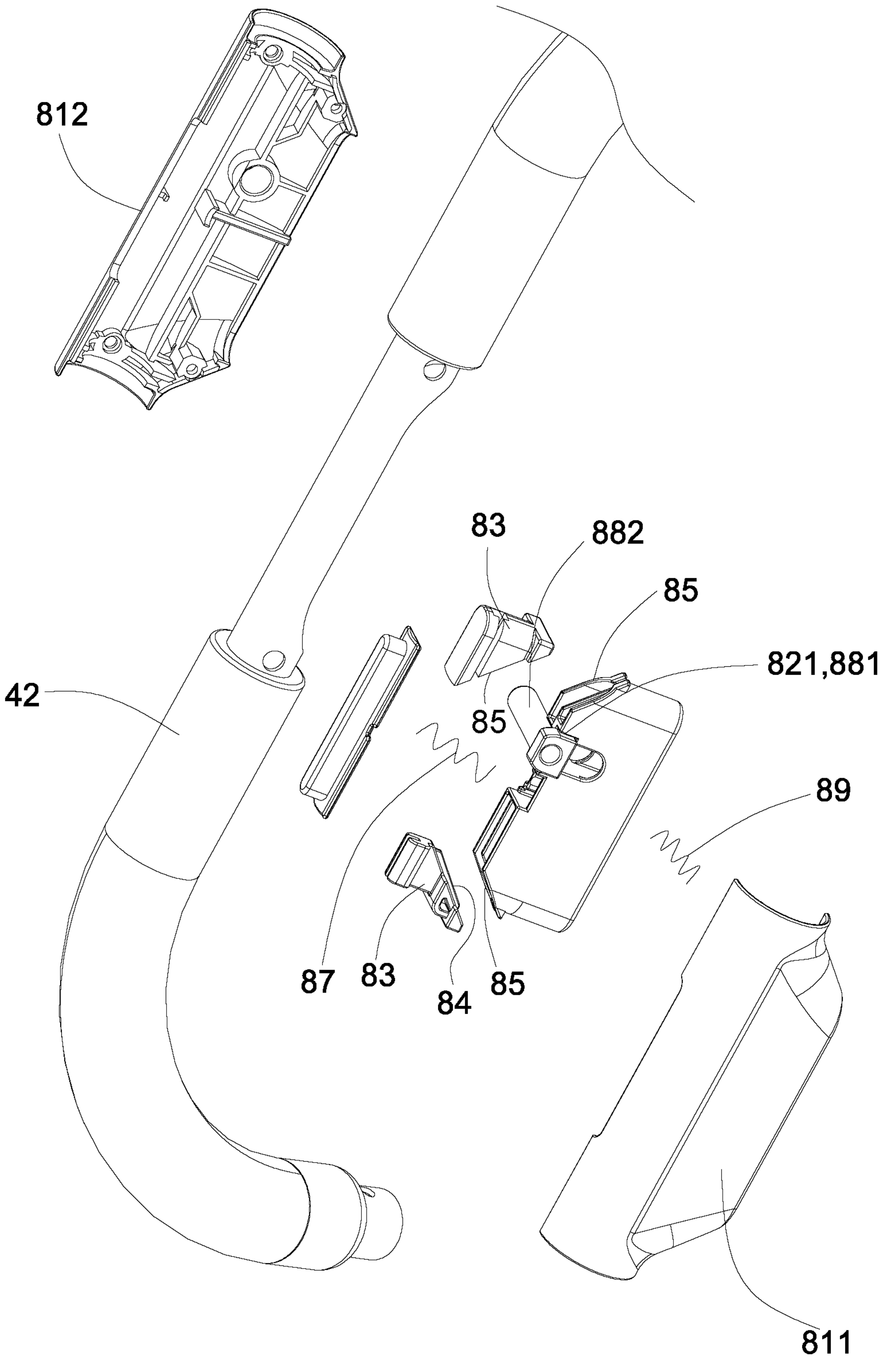
FIG. 9 is an exploded view illustrating the structure of the unlocking assembly of the child stroller frame according o the preferred embodiment of the present invention.
Figure 10:
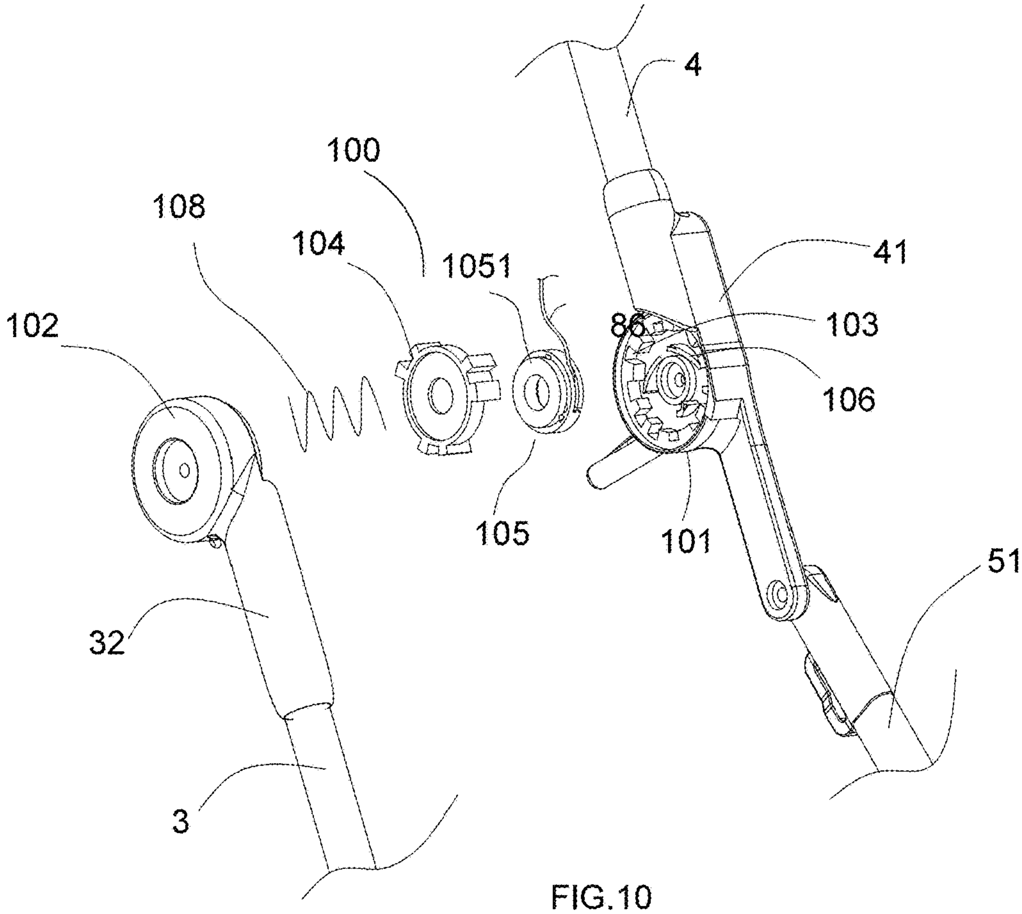
FIG. 10 is an exploded view illustrating the structure of a locking mechanism of the child stroller frame according o the preferred embodiment of the present invention.
Figure 11:
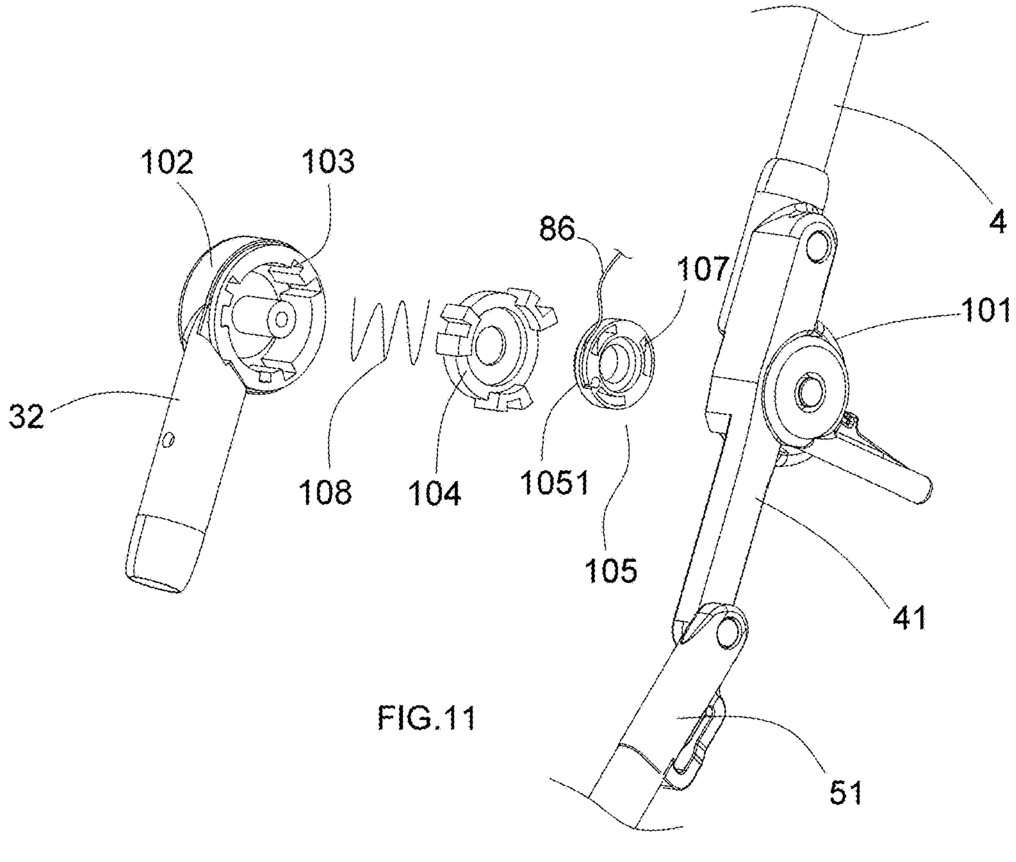
FIG. 11 is another exploded view illustrating the structure of the locking mechanism of the child stroller frame according o the preferred embodiment of the present invention.

As shown in FIGS. 1 and 7, upper ends of the two push rods 4 are assembled with a U-shaped push handle 42 for convenient gripping. The locking mechanism 100 is located between at least a set of the push rod connecting base 41 and the upper connecting base 32. A middle of the push handle 42 is provided with an unlocking assembly 8 for controlling the unlocking operation.

The locking mechanism 100, as shown in FIGS. 7 to 11, comprises a first connection housing 101 on the push rod connecting base 41 and a second connection housing 102 on the upper connecting base 32. Both housings have multiple locking slots 103 arranged circumferentially. Inside the space enclosed by these housings, a spline 104 moves laterally to engage both locking slots 103 simultaneously. A movable component 105 is positioned between the spline 104 and the first connection housing 101. When rotated, the movable component 105 pushes the spline 104 out of engagement with the locking slots 103 of the first connection housing 101 and the second connection housing 102. The unlocking assembly 8 is coupled to the movable component 105. Additionally, a reset spring 108 is provided between the spline 104 and the first connection housing 101 to push the spline 104 back into its original position. When the unlocking assembly 8 drives the movable component 105 to rotate, the component pushes the spline 104 out of the locking slots 103 of the first connection housing 101, compressing the reset spring 108. At this moment, the push rods 4 can be rotated and pressed downward to fold the child stroller frame.

As shown in FIGS. 8 to 11, the movable component 105 comprises a main body 1051 with multiple inclined grooves 107 arranged circumferentially. The first connection housing 101 is provided with multiple inclined protrusions 106 that match the inclined grooves 107. When the main body 1051 is rotated, these inclined protrusions 106 are respectively engaged with the inclined grooves 107, causing the main body 1051 to move laterally, which in turn pushes the spline 104 out of engagement with the locking slots 103 of the first connection housing 101, thereby unlocking the locking mechanism 100.

As shown in FIGS. 7 to 11, the unlocking assembly 8 comprises a fixing housing 81 mounted on the push handle 42. The fixing housing 81 comprises a front shell 811 and a rear shell 812 that clamp the push handle 42 between them. Inside the fixing housing 81, an exposed operation block 82 can slide with respect to the fixing housing 81. Additionally, a sliding block 83 is positioned inside the fixing housing 81, which moves laterally when pushed by the operation block 82. The sliding block 83 has a first inclined surface 84, while the operation block 82 has a second inclined surface 85 that pushes against the first inclined surface 84 when sliding inward. A pull cord 86 connects the sliding block 83 to the main body 1051 of the movable component 105. A first spring 87 is provided inside the fixing housing 81 to push the operation block 82 back to its original position. The operation block 82 features a square slot 821 and a narrower clearance slot 822 communicated to the square slot 821. A secondary lock button 88, which is also provided inside the fixing housing 81, comprises a blocking piece 881 that fits into the square slot 821 to prevent the operation block 82 from sliding. The blocking piece 881 is connected to a press rod 882 that extends outside the fixing housing 81. When the blocking piece 881 disengages from the square slot 821, the press rod 882 moves within the clearance slot 822. A second spring 89 is provided inside the fixing housing 81 to push the secondary lock button 88 back to its original position. When folding the child stroller frame into the folded state, the press rod 882 is pressed first, causing the blocking piece 881 to exit the square slot 821. Once the blocking piece 881 is removed, the square slot 821 and clearance slot 822 align with the press rod 882, allowing free movement of the operation block 82. The user can then grip and slide the operation block 82 inward, causing its second inclined surface 85 to push against the first inclined surface 84 of the sliding block 83. This lateral movement of the sliding block 83 pulls the pull cord 86, which rotates the main body 1051 of the movable component 105, ultimately disengaging the spline 104 from the locking slots 103 of the first connection housing 101 and unlocking the child stroller frame. Thus, the unlocking process can be performed with a single hand. The thumb first presses the press rod 882, followed by the fingers gripping and sliding the operation block 82 inward. This sequential pressing and sliding actions enables quick and easy unlocking of the child stroller frame, enhancing safety and preventing accidental unlocking due to unintended movement of the operation block 82.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A child stroller frame which is capable of being moved between an unfolded state and a folded state, comprising:

two front rods each comprising an upper end and a lower end;

two rear rods each comprising an upper end and a lower end;

two support rods each comprising an upper end and a lower end;

two push rods each comprising a lower end;

a front connecting base connected to said upper end of each said front rod;

a front wheel frame connected to said lower end of each said front rod, wherein a front wheel is connected to said front wheel frame;

a rear connecting base connected to said upper end of each said rear rod, wherein said rear connecting base is rotatably connected to said front connecting base around a first axis;

a rear wheel frame connected to said lower end of each said rear rod, wherein a rear wheel is connected to said rear wheel frame;

a lower connecting base connected to said lower end of each said support rod, wherein said lower connecting base is rotatably connected to said rear connecting base around a second axis;

an upper connecting base connected to said upper end of each said support rod;

a push rod connecting base connected to said lower end of each said push rod, wherein said push rod connecting base is rotatably connected to said upper connecting base around a third axis, each said push rod connecting base comprises a lower end;

a first transmission rod connected to each said push rod connecting base, wherein said lower end of each push rod connecting base is rotatably connected to said first transmission rod around a fourth axis, wherein said first transmission rod comprises a lower end which is rotatably connected to said rear connecting base around a fifth axis;

a second transmission rod hinged between said lower end of each said first transmission rod and the corresponding front wheel frame;

a rotation sleeve connected to each said support rod, wherein a middle section of each said support rod is rotatably connected to the corresponding rotation sleeve around a sixth axis; and a handrail rod which is slidable along an inner side of each said rotation sleeve, wherein said handrail rod comprises a rear end which is rotatably connected to the corresponding first transmission rod around a seventh axis;

wherein when the child stroller frame is moved from said unfolded state to said folded state, each said push rods is pushed forward and pressed downward, each said push rod connecting base pushes the corresponding first transmission rod and the corresponding upper connecting base downward, causing the corresponding first transmission rod and the corresponding support rod to rotate towards the corresponding rear rod, as each said first transmission rod rotates, said lower end of each said first transmission rod tilts upward, pulling the corresponding second transmission rod, which in turn pulls the corresponding front rod towards the corresponding rear rod, each said first transmission rod is rotated to pull said rear end of the corresponding handrail rod and move with respect to the corresponding handrail rod, causing the corresponding handrail rod to slide backward along the inner side of the corresponding rotation sleeve.

2. The child stroller frame according to claim 1, further comprising a rotation base connected to each said lower connecting base, wherein said lower connecting base is rotatably connected to said rotation base around an eighth axis, a base rod is provided to be slidable along an inner side of the corresponding rotation base, said base rod comprises a rear end which is rotatably connected to the corresponding first transmission rod around a ninth axis.

3. The child stroller frame according to claim 2, wherein said rotation base comprises a base body rotatably connected to the corresponding lower connecting base, said base body is provided with an inwardly protruding portion having a sliding channel for allowing sliding movement of the corresponding base rod.

4. The child stroller frame according to claim 1, wherein each said rotation sleeve comprises a first rotation body which is rotatably connected to the corresponding support rod, said first rotation body comprises a rear end which is provided with a second rotation body which is integrally and upwardly protruded from said first rotation body, wherein said second rotation body has a through hole for the corresponding handrail rod to slide therethrough, wherein in said unfolded state, a lower side of each said handrail rod rests against an wall of said through hole and an upper surface of said first rotation body.

5. The child stroller frame according to claim 2, further comprising a leg support frame which is connected to a front side of each said base rod, wherein said leg support frame comprises a front support leg which is capable of rotating with respect to the corresponding base rod, wherein a pivot rod is rotatably connected to a rear side of the corresponding front support leg, wherein a positioning structure is provided between said pivot rod and said base rod to lock said leg support frame, said positioning structure comprises a first positioning protrusion and a second positioning protrusion at said front side of said base rod, said pivot rod is provided with a locking block which is capable of engaging or disengaging from said first positioning protrusion and said second positioning protrusion when rotated, wherein a reset component is provided between said pivot rod and said front support leg for pushing said pivot rod back into position.

6. The child stroller frame according to claim 1, further comprising a U-shaped push handle assembled with said two push rods.

7. The child stroller frame according to claim 6, further comprising a locking mechanism which is located between at least a set of said push rod connecting base and said upper connecting base, wherein an unlocking mechanism is provided at a middle of said push handle for unlocking said locking mechanism.

8. The child stroller frame according to claim 7, wherein said locking mechanism comprises a first connection housing on said push rod connecting base and a second connection housing on said upper connecting base, each of said first connection housing and said second connection housing has multiple locking slots arranged circumferentially, inside a space enclosed by aid first connection housing and said second connection housing, a spline is provided to move laterally to engage with said locking slots simultaneously, a movable component is positioned between said spline and said first connection housing, said unlocking assembly is coupled to said movable component, a reset spring is provided between said spline and said first connection housing.

9. The child stroller frame according to claim 8, wherein said movable component comprises a main body with multiple inclined grooves arranged circumferentially, said first connection housing is provided with multiple inclined protrusions which are respectively matched with said inclined grooves, when said main body is rotated, said inclined protrusions are respectively engaged with said inclined grooves, causing said main body to move laterally, which in turn pushes said spline out of engagement with said locking slots of said first connection housing, thereby unlocking said locking mechanism.

10. The child stroller frame according to claim 9, wherein said unlocking assembly comprises a fixing housing mounted on said push handle, said fixing housing comprises a front shell and a rear shell that clamp said push handle therebetween, wherein inside said fixing housing, an exposed operation block is arranged and is capable of sliding with respect to said fixing housing, a sliding block is positioned inside said fixing housing and move laterally when pushed by said operation block, said sliding block has a first inclined surface, while said operation block has a second inclined surface that pushes against said first inclined surface when sliding inward, a pull cord is arranged to connect said sliding block to said main body of said movable component, a first spring is provided inside said fixing housing for resetting said operation block, said operation block has a square slot and a narrower clearance slot communicated to said square slot, a secondary lock button, which is also provided inside said fixing housing, comprises a blocking piece which fits into said square slot to prevent said operation block from sliding, a press rod is connected to said blocking piece and is extending outside said fixing housing, when said blocking piece disengages from said square slot, said press rod moves within said clearance slot, wherein a second spring is provided inside said fixing housing for resetting said secondary lock button.

11. The child stroller frame according to claim 1, wherein said two front rods, said two rear rods, said two support rods, and said two push rods are all made of carbon fiber material.

12. The child stroller frame according to claim 1, further comprising a U-shaped handle which is detachably connected to said two handrail rods.

* * * * *